(12) United States Patent
Ulrich et al.

(10) Patent No.: US 11,724,330 B2
(45) Date of Patent: Aug. 15, 2023

(54) WELDING SYSTEM HAVING AN AUXILIARY CHARGER

(71) Applicant: Illinois Tool Works Inc., Glenview, IL (US)

(72) Inventors: James F. Ulrich, Appleton, WI (US); Allen Raymond Sykes, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 214 days.

(21) Appl. No.: 17/095,368

(22) Filed: Nov. 11, 2020

(65) Prior Publication Data
US 2021/0060683 A1 Mar. 4, 2021

Related U.S. Application Data

(63) Continuation of application No. 13/841,626, filed on Mar. 15, 2013, now Pat. No. 10,864,592.

(51) Int. Cl.
*B23K 9/10* (2006.01)

(52) U.S. Cl.
CPC .......... *B23K 9/1075* (2013.01); *B23K 9/1006* (2013.01); *B23K 9/1081* (2013.01)

(58) Field of Classification Search
CPC ... B23K 9/1006; B23K 9/1075; B23K 9/1081
USPC ................ 219/108, 130.1, 130.21, 133, 134, 219/137 PS; 307/64, 65; 320/138
See application file for complete search history.

(56) References Cited

U.S. PATENT DOCUMENTS

| | | |
|---|---|---|
| 5,039,931 A | 8/1991 | Wieland |
| 5,198,698 A | 3/1993 | Paul |
| 6,037,571 A | 3/2000 | Christopher |
| 6,818,860 B1 | 11/2004 | Stava |
| 7,870,915 B2 | 1/2011 | Beeson |
| 7,908,911 B2 | 3/2011 | Renner |
| 8,257,056 B2 | 9/2012 | Peters |
| 8,261,717 B2 | 9/2012 | Peotter |
| 2005/0263513 A1 | 12/2005 | Leisner |
| 2006/0037953 A1 | 2/2006 | Matthews |
| 2007/0181547 A1 | 8/2007 | Vogel |
| 2009/0193800 A1 | 8/2009 | Peters |

(Continued)

FOREIGN PATENT DOCUMENTS

WO 2007094896 8/2007

OTHER PUBLICATIONS

International Search Report fro PCT application No. PCT/US2014/018118, dated Aug. 22, 2014, 10 pgs.

(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

A welding system includes an engine configured to drive a generator to produce a first power output. The welding system also includes a battery configured to discharge energy to produce a second power output. In addition, the welding system includes an auxiliary charger coupled to the battery and the generator. The auxiliary charger is configured to maintain a float charge of the battery when the first and second power outputs are reduced from a base load.

20 Claims, 3 Drawing Sheets

(56) References Cited

U.S. PATENT DOCUMENTS

| | | |
|---|---|---|
| 2009/0218327 A1 | 9/2009 | Beeson |
| 2010/0199655 A1 | 8/2010 | Renner |
| 2010/0199950 A1 | 8/2010 | Renner |
| 2010/0316505 A1 | 12/2010 | Renner |
| 2010/0318283 A1 | 12/2010 | Renner |
| 2011/0006046 A1 | 1/2011 | Albrecht |
| 2011/0052415 A1 | 3/2011 | Renner |
| 2011/0114607 A1 | 5/2011 | Albrecht |
| 2011/0173963 A1 | 7/2011 | Renner |
| 2012/0023921 A1 | 2/2012 | Peters |
| 2012/0023922 A1 | 2/2012 | Renner |
| 2012/0023923 A1 | 2/2012 | Peters |
| 2012/0029775 A1 | 2/2012 | Peters |
| 2014/0119947 A1* | 5/2014 | Bishop .................. G05B 15/02 700/275 |
| 2014/0175869 A1 | 6/2014 | Phillips |

OTHER PUBLICATIONS

Canadian Office Action Appl. No. 2,891,943 dated Jan. 18, 2018 (4 pgs.).

* cited by examiner

WELDING SYSTEM HAVING AN AUXILIARY CHARGER

CROSS-REFERENCE TO RELATED APPLICATIONS

This patent application is a continuation of U.S. patent application Ser. No. 13/841,626, filed on Mar. 15, 2013, which is incorporated herein by reference in its entirety.

BACKGROUND

The invention relates generally to welding systems, and, more particularly, to hybrid engine-driven welding systems having an auxiliary charger.

Welding is a process that has become increasingly ubiquitous in various industries and applications. As such, a variety of welding applications, such as construction and shipbuilding, may require welding devices that are portable and can easily be transported to a remote welding location. Accordingly, in some cases, it is often desirable for such welding devices to be operable as standalone units remote from a power grid or other primary power source. Therefore, a variety of welding systems utilizing alternate power sources, such as batteries, have been developed. Furthermore, during a welding operation, some weld load demands may be small (e.g., below 150 amps), and to meet such small load demands, the engine-generator unit is activated. However, activation of the engine-generator to meet such small load demands is often inefficient. Accordingly, there exists a need for hybrid welding systems that overcome such drawbacks.

BRIEF DESCRIPTION

In an exemplary embodiment, a welding system includes an engine configured to drive a generator to produce a first power output. The welding system also includes a battery configured to discharge energy to produce a second power output. In addition, the welding system includes an auxiliary charger coupled to the battery and the generator. The auxiliary charger is configured to maintain a float charge of the battery when the first and second power outputs are reduced from a base load.

In another embodiment, a hybrid welding power supply unit includes an auxiliary charger coupled to a battery. The auxiliary charger is configured to maintain a float charge of the battery when the power output produced by the hybrid welding power supply unit is reduced from a base load.

In another embodiment, a method includes maintaining a float charge of a battery of a hybrid welding power supply unit when the power output produced by the hybrid welding power supply unit is reduced from a base load.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a welding system having an auxiliary charger are provided. In particular, the auxiliary charger is configured to maintain a float charge of a battery. More specifically, the auxiliary charger maintains the float charge of the battery when power being produced by the battery or generator that is driven by an engine is reduced from a base load. In certain embodiments, the power used by the auxiliary charger to maintain the float charge is received from an alternator of the engine, from a utility power source (e.g., an electrical grid), from an electric system of a work vehicle, or some combination thereof. In certain embodiments, a controller may be used to selectively control which of these power sources are used by the auxiliary charger to maintain the float charge.

Figure 1:
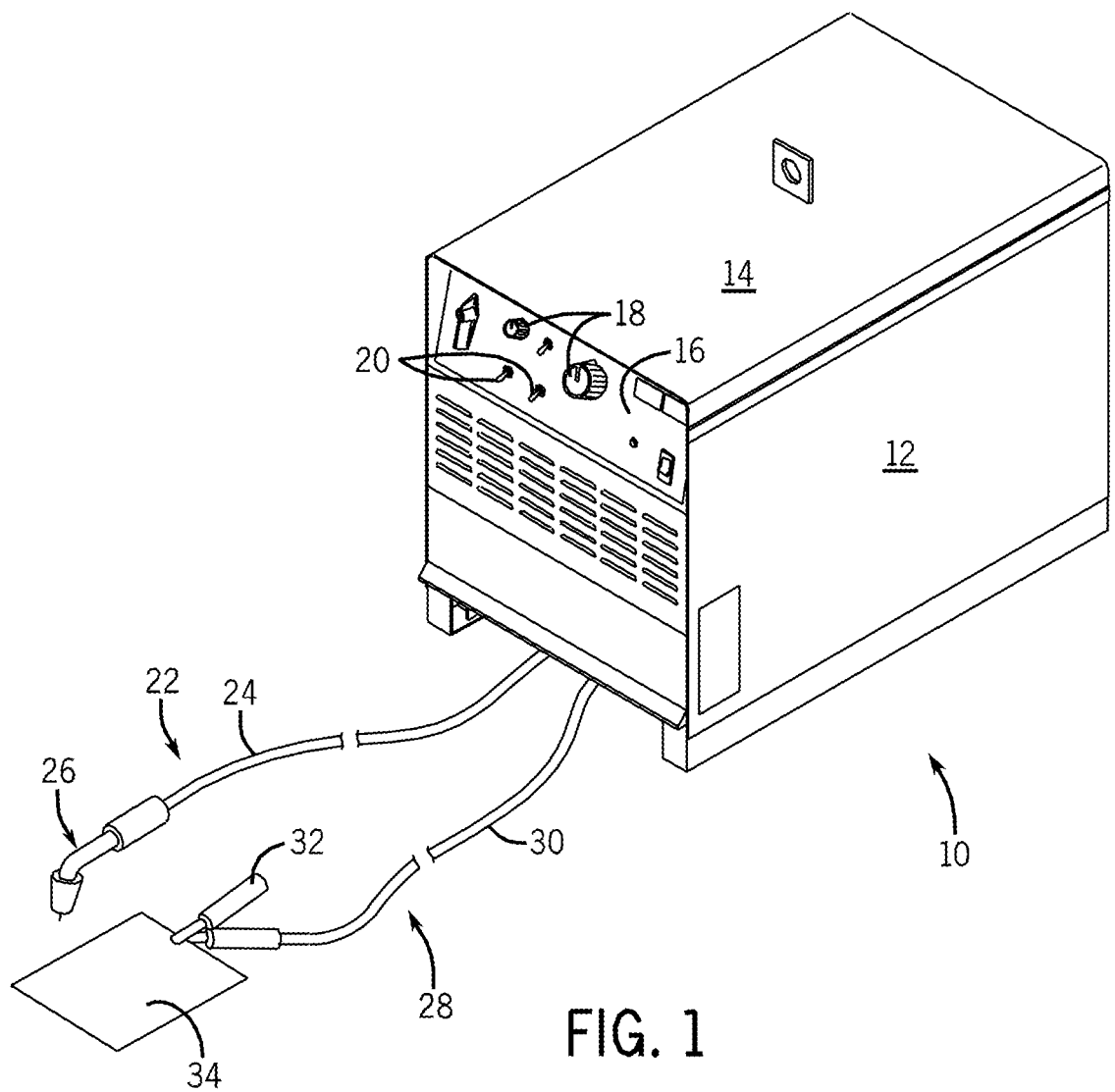
FIG. 1 is a perspective view of an exemplary hybrid welding system, which functions to power, control, and provide consumables to a welding operation and/or auxiliary equipment.

Turning now to the drawings, FIG. 1 is a perspective view of an exemplary hybrid welding system 10, which functions to power, control, and provide consumables to a welding operation and/or auxiliary equipment. The hybrid welding system 10 includes a hybrid power supply unit 12 based in a cabinet or enclosure 14. In some embodiments, the hybrid welding system 10 may be configured to permit the hybrid power supply unit 12 to be moved from place to place relatively easily, or may be designed as a generally stationary system. Moreover, the hybrid welding system 10 may be designed for field operation, in which case it may include at least one of an engine-generator unit, a fuel cell, and an energy storage device within the enclosure 14 that provide the necessary power, conditioned appropriately for the given welding operation. Embodiments of the hybrid welding system 10 may be designed for use in close proximity to one or more sources of utility power or remote from such sources. As such, in some embodiments, the hybrid power supply unit 12 may be communicatively coupled to additional system components, such as a wall power outlet, a battery, engine-driven power sources, and so forth. In other embodiments, however, the hybrid power supply unit 12 may be adapted to operate as a standalone unit, generating the power necessary for a welding operation and/or auxiliary operations while isolated from additional power sources.

The hybrid power supply unit 12 includes a control panel 16, through which a user may control the supply of materials, such as power, shielding gas, and so forth, to a welding operation, via dials 18, switches 20, and so forth. As the user adjusts welding parameters via the control panel 16, signals are generated and received by a controller within the hybrid power supply unit 12. The hybrid power supply unit 12 controller implements the desired welding operation in accordance with these inputs. For instance, in one embodiment, the controller may implement a constant voltage regime and a wire feed suitable for use with a MIG welding operation.

An electrode assembly 22 extends from the hybrid power supply unit 12 to the location of the weld. A first cable 24 and a welding electrode 26 couple to the hybrid power supply unit 12 as components of the electrode assembly 22. The electrode 26 may be any electrode suitable for a variety of welding processes. For instance, the electrode 26 may be provided in a torch suitable for metal inert gas (MIG) operations, a stinger suitable for stick welding operations, and so forth. A work assembly 28 extending from the hybrid power supply unit 12 to the weld includes a second cable 30 terminating in a work lead clamp 32. During operation, the work lead clamp 32 typically connects to a workpiece 34 to close the circuit between the electrode 26, the workpiece 34, and the hybrid power supply unit 12, thus ensuring proper current flow. That is, as the welding operator contacts or closely approaches the tip of the electrode 26 to the workpiece 34, an electrical circuit is completed through the cables 24 and 30, the electrode 26, the workpiece 34, and the clamp 32 to generate an arc between the electrode tip and the workpiece 34.

Figure 2:
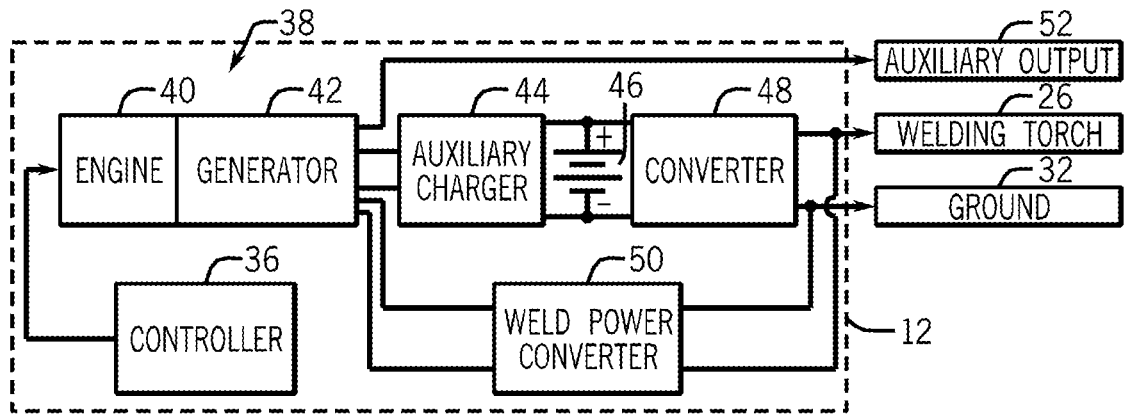
FIG. 2 is a schematic diagram of a hybrid power supply unit of FIG. 1.

FIG. 2 is a schematic diagram of the hybrid power supply unit 12 of FIG. 1. As illustrated, the hybrid power supply unit 12 includes a controller 36, an engine-generator unit 38 including an engine 40 and a generator 42, an auxiliary charger 44, a battery 46, a converter 48, and a weld power converter 50. The hybrid power supply unit 12 includes output terminals coupling to an auxiliary output 52, a welding output 26 illustrated as a welding torch, and a ground (or common) 32.

In the illustrated embodiment, the engine-generator unit 38 and the battery 46 are each coupled to a separate power converter, weld power converter 50 and converter 48, respectively. However, in other embodiments, a single power converter may be configured to receive power from both the engine-generator unit 38 and the battery 46 and to convert such incoming power to one or more appropriate power outputs. Still further, the illustrated embodiment shows the engine-generator unit 38, the weld power converter 50, the battery 46, and the converter 48 housed in a single mechanical enclosure. However, in other embodiments, such components may be coupled together in mechanical enclosures in any of a variety of suitable ways. For example, in one embodiment, the engine-generator unit 38 may be coupled with the weld power converter 50 in one enclosure, and the battery 46 and the converter 48 may be housed in another mechanical enclosure. In such an embodiment, the separate mechanical enclosures may be coupled via cabling through the welding environment.

During operation, the hybrid power supply unit 12 is configured to meet the commanded power levels of the welding operation, as described in detail below. Such commanded power output levels may be commanded based on one or more of amperage, voltage, wire type, wire feed speed, stick electrode diameter, and so forth. As such, the engine 40 is configured to drive the generator 42 to produce power, which may be utilized to provide the auxiliary output 52, to charge the battery 46 via auxiliary charger 44, and/or to power the weld output via the weld power converter 50. In some embodiments, the engine 40 may have a rating of below approximately 75 hp, below approximately 55 hp, below approximately 45 hp, below approximately 35 hp, below approximately 25 hp, below approximately 15 hp, or below approximately 5 hp. For example, for high power welding operations (e.g., cutting or gouging operations) the engine 40 may have a rating of up to approximately 75 hp such that the engine 40 is configured to meet the high power demands of the welding operation.

Further, the battery 46 is configured to discharge to produce power, which may be routed to the welding torch 26 via converter 48 and/or to cutting and/or gouging torches and/or auxiliary power through appropriate converters, such as to a synthetic auxiliary output. The controller 36 is configured to receive input (e.g., sensor feedback, manual inputs, etc.) regarding the process operation and to access power from the engine-generator unit 38 and the battery 46 to produce power as needed. For example, such an embodiment may be applicable in instances of low frequency, high peak power demands in which the engine-generator output is supplemented by the energy storage device output. In such embodiments, the energy storage device may be recharged during instances of lower power demands from either the engine-generator unit 38 or from another power source when the engine-generator unit 38 is OFF.

As described in greater detail below, the hybrid power supply unit 12 is configured to ensure that the hybrid welding system 10 is capable of supplying full weld power on demand after long periods of inactivity. Under certain operating conditions, the hybrid power supply unit 12 may need to supply more power than the engine-generator unit 38 alone is capable of producing. For example, when the hybrid power supply unit 12 operates at full load, the hybrid power supply unit 12 discharges the power stored in the battery 46 to some extent. As such, the engine-generator unit 38 must run for a period of time after the weld is complete to fully re-charge the battery 46.

Figure 3:
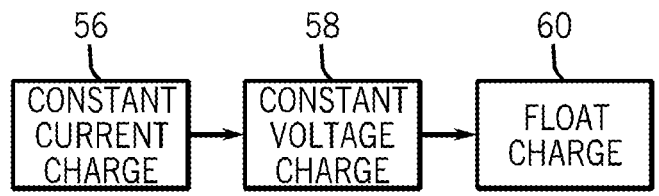
FIG. 3 illustrates multiple charging stages of a charge cycle for a battery of the hybrid power supply unit of FIG. 2.

The battery 46 generally has several stages 56, 58, 60 of its charge cycle. For example, FIG. 3 illustrates multiple charging stages of the charge cycle for the battery 46. In the first stage 56 (e.g., a "constant current charge" stage), a relatively high current is supplied to the battery 46 until the voltage in the battery 46 reaches a limiting voltage. In the second stage 58 (e.g., a "constant voltage charge" stage), the voltage of the battery 46 is held substantially constant (e.g., within a few volts) until the current in the battery 46 drops to a relatively low level (e.g., less than approximately 5 amps). After the current in the battery 46 reaches this relatively low level, the voltage of the battery 46 is held constant for a fixed period of time. In the third stage (e.g., a "float charge" stage), the voltage in the battery 46 is held substantially constant for an indefinite period of time such that the battery fully charges in spite of inherent self-discharge current characteristics. In other words, once the battery 46 is fully charged, it may still tend to slightly discharge over time.

The auxiliary charger 44 described herein is configured to ensure that the battery 46 remains fully charged during the float charge stage 60. The engine 40 may have to run at its full rated speed in order to generate enough voltage to float charge the battery 46. When the engine 40 runs at its full rated speed, the engine 40 uses more fuel than when throttled back to operate at idle speed. The embodiments described herein reduce the amount of time that the engine 40 must operate at full rated speed. More specifically, the embodiments described herein allow the battery 46 to be float charged and ready for full power welding in a broader range of circumstances than was previously possible.

Figure 4:
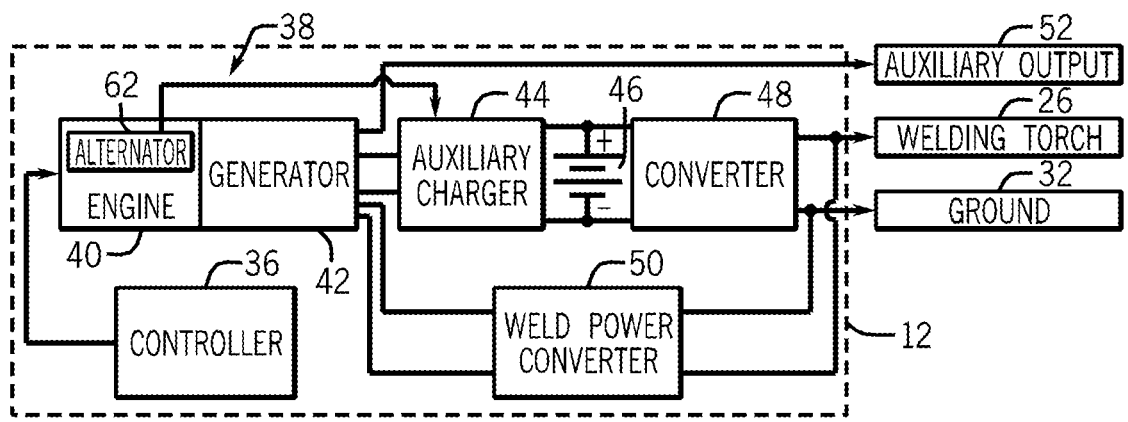
FIG. 4 is a schematic diagram of the hybrid power supply unit of FIG. 2, wherein an auxiliary charger maintains a float charge of the battery using power from an alternator of an engine of the hybrid power supply unit.
Figure 5:
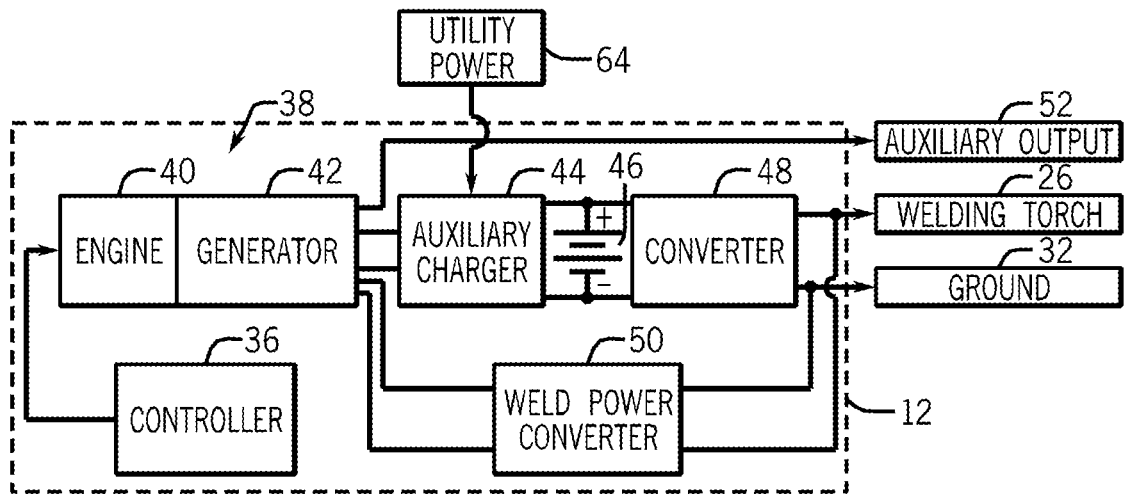
FIG. 5 is a schematic diagram of the hybrid power supply unit of FIG. 2, wherein the auxiliary charger maintains a float charge of the battery using power from a utility power source.
Figure 6:
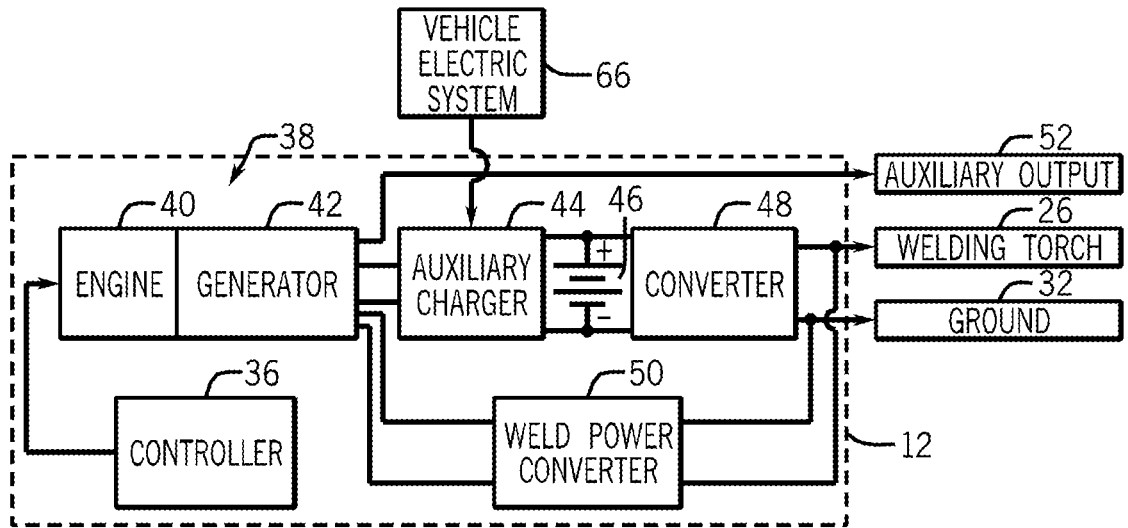
FIG. 6 is a schematic diagram of the hybrid power supply unit of FIG. 2, wherein the auxiliary charger maintains a float charge of the battery using power from a work vehicle.

More specifically, the auxiliary charger 44 maintains the float charge on the battery 46 when the power output produced by the hybrid power supply unit 12 is reduced from a base load. For example, as illustrated in FIG. 4, in certain embodiments, the auxiliary charger 44 may be supplied with power from an alternator 62 of the engine 40. When the engine 40 idles, 12-volt (e.g., alternator) power is still available via the alternator 62 in sufficient quantity to maintain the trickle charge (or "float charge") needed to overcome self discharging of the battery 46 to keep the battery 46 at full charge. As another example, as illustrated in FIG. 5, in certain embodiments, the auxiliary charger 44 may be plugged into utility power 64 (e.g., an electrical grid), and may maintain the float charge of the battery 46 via the utility power 64. As a further example, as illustrated in FIG. 6, the auxiliary charger 44 may be connected to an electric system 66 of a work vehicle, such as a utility truck. When the work vehicle (e.g., utility truck) carrying the hybrid power supply unit 12 is running, the float charge of the battery 46 may be maintained by the vehicle's power. Exemplary work vehicles described in greater detail in U.S. Pat. Nos. 7,870,915, 7,908,911, 8,257,056, 8,261,717, and U.S. patent application publication numbers 2009/0193800, 2009/0218327, 2010/0199655, 2010/0199950, 2010/0316505, 2010/0318283, 2011/0052415, 2011/0173963, 2012/0023921, 2012/0023922, 2012/0023923, 2012/0029775, each of which is incorporated herein by reference for all purposes.

Figure 7:
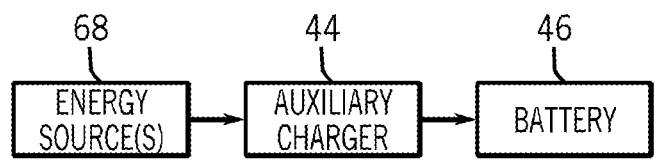
FIG. 7 illustrates how any of a plurality of energy source(s) may provide power to the auxiliary charger for the purpose of maintaining the float charge of the battery.

As such, as illustrated in FIG. 7, one or more energy source(s) 68 may be used to provide power to the auxiliary charger 44, and the auxiliary charger 44 may use the power provided by the one or more energy source(s) 68 to maintain the float charge of the battery 46 when the hybrid power supply unit 12 is producing a power output that is reduced from a base load (e.g., when power produced via either or both of the converters 48, 50 is reduced from a base load). For example, if the power output produced by either of the converters 48, 50 is reduced by some predetermined amount (e.g., reduced by approximately 30% or more, reduced by approximately 20% or more, reduced by approximately 10% or more, or some other reduction) from a base load or relatively constant load, the auxiliary charger 44 may us the excess power output capabilities of the hybrid power supply unit 12 to maintain the float charge of the battery 46.

In certain embodiments, the controller 36 described above may be configured to selectively adjust which of the energy source(s) 68 (e.g., the generator 42, the alternator 62 of the engine 40, the utility power 64, the electric system 66 of a work vehicle, and so forth) described above are used to provide power to the auxiliary charger 44. More specifically, the auxiliary charger 44 may be connected to some or all of the energy source(s) 68 described above, and the controller 36 may be configured to selectively adjust which of these energy source(s) 68 provide power to the auxiliary charger 44 for the purpose of maintaining the float charge of the battery 46.

As described herein, the float charge maintains the charge of the battery 46 near a given (e.g. maximum) charge level while the battery 46 is not being used despite the inherent tendency of the battery 46 to discharge over time while not being used. For example, in certain embodiments, when the battery 46 is not being used (e.g., is not providing power to the welding torch 26), the float charge of the battery 46 may be maintained, thereby preserving the full capacity of the battery 46 once power is required from the battery 46. As such, in certain embodiments, providing the float charge from the auxiliary charger 44 may maintain the full charge of the battery 46 within approximately 5 percent, or even within approximately 1 percent, of a maximum full charge of the battery 46.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
    an engine configured to drive a generator to produce a first power output;
    a battery configured to discharge energy to produce a second power output;
    an auxiliary charger coupled to the battery, the generator, and an energy source that is separate from the welding system generator; and
    a controller configured to:
        receive a first input comprising a power level of the first power output;
        receive a second input comprising a power level of the second power output;
        receive a third input comprising a power level of a third power output from a battery charging circuit, wherein the first input and the third input comprise a hybrid power output; and
        select the energy source that is separate from the welding system generator to provide power to the auxiliary charger in response to a reduction of the first power output or the third power output by a predetermined amount, wherein the auxiliary charger is configured to maintain a float charge of the battery when the first and second power outputs are reduced from a base load.

2. The welding system of claim 1, wherein the auxiliary charger receives power from the generator and maintains the float charge of the battery using the power received from the generator.

3. The welding system of claim 1, wherein the auxiliary charger receives power from an alternator of the engine and maintains the float charge of the battery using the power received from the alternator when the engine idles.

4. The welding system of claim 3, wherein the auxiliary charger receives 12-volt power from the alternator of the engine when the engine idles.

5. The welding system of claim 1, wherein the auxiliary charger receives power from a utility power source and maintains the float charge of the battery using the power received from the utility power source.

6. The welding system of claim 1, wherein the third power source comprises an electric system of a work vehicle, the controller to maintain the float charge of the battery using the power received from the electric system.

7. The welding system of claim 6, wherein the work vehicle comprises a utility truck.

8. The welding system of claim 1, wherein the controller is configured to selectively adjust which of a plurality of energy sources delivers power to the auxiliary charger to enable the auxiliary power to maintain the float charge of the battery.

9. A hybrid welding power supply unit, comprising:
    an auxiliary charger coupled to a battery, an engine-generator unit, and an energy source that is separate from the engine-generator unit; and
    a controller configured to select the energy source that is separate from the welding system generator to provide power to the auxiliary charger in response to a reduction of a first power output or a third power output by a predetermined amount, wherein the first input and the third input comprise a hybrid power output, wherein the auxiliary charger is configured to maintain a float charge of the battery when the power output produced by the hybrid welding power supply unit is reduced from a base load.

10. The hybrid welding power supply unit of claim 9, wherein the auxiliary charger receives power from a generator of the engine-generator unit of the hybrid welding power supply unit and maintains the float charge of the battery using the power received from the generator.

11. The hybrid welding power supply unit of claim 9, wherein the auxiliary charger receives power from an alternator of an engine of the hybrid welding power supply unit and maintains the float charge of the battery using the power received from the alternator when the engine idles.

12. The hybrid welding power supply unit of claim 9, wherein the auxiliary charger receives power from a utility power source and maintains the float charge of the battery using the power received from the utility power source.

13. The hybrid welding power supply unit of claim 9, wherein the auxiliary charger receives power from an electric system of a work vehicle and maintains the float charge of the battery using the power received from the electric system.

14. The hybrid welding power supply unit of claim 9, comprising a controller configured to selectively adjust which of a plurality of energy sources delivers power to the auxiliary charger to enable the auxiliary power to maintain the float charge of the battery.

15. A method, comprising:
receiving a first input comprising a power level of a first power output from an engine-generator unit of a hybrid welding power supply unit;
receiving a second input comprising a power level of a second power output from a battery of the hybrid welding power supply unit;
receiving a third input comprising a power level of a third power output from a battery charging circuit of the hybrid welding power supply unit, wherein the first input and the third input comprise a hybrid power output;
selecting the energy source that is separate from the welding system generator to provide power to the auxiliary charger in response to a reduction of the first power output or the third power output by a predetermined amount; and
maintaining a float charge of the battery when the power output produced by the hybrid welding power supply unit is reduced from a base load.

16. The method of claim 15, comprising maintaining the float charge of the battery using power received from the generator.

17. The method of claim 15, comprising maintaining the float charge of the battery using power received from an alternator of an engine of the hybrid welding power supply unit.

18. The method of claim 15, comprising maintaining the float charge of the battery using power received from a utility power source to which the hybrid welding power supply unit is electrically coupled.

19. The method of claim 15, comprising maintaining the float charge of the battery using power received from a work vehicle to which the hybrid welding power supply unit is electrically coupled.

20. The method of claim 15, comprising selectively adjusting which of provides power for the purpose of maintaining the float charge of the battery.

* * * * *